(12) United States Patent
Mei et al.

(10) Patent No.: US 10,125,815 B2
(45) Date of Patent: Nov. 13, 2018

(54) ROTATING MACHINE WITH AT LEAST ONE ACTIVE MAGNETIC BEARING AND AUXILIARY ROLLING BEARINGS

(71) Applicant: Nuovo Pignone SRL, Florence (IT)

(72) Inventors: Luciano Mei, Florence (IT); Manuele Bigi, Florence (IT); Giuseppe Sassanelli, Florence (IT)

(73) Assignee: Nuovo Pignone Srl, Florence (IT)

( * ) Notice: Subject to any disclaimer, the term of this patent is extended or adjusted under 35 U.S.C. 154(b) by 332 days.

(21) Appl. No.: 14/894,727

(22) PCT Filed: May 29, 2014

(86) PCT No.: PCT/EP2014/061217
§ 371 (c)(1),
(2) Date: Nov. 30, 2015

(87) PCT Pub. No.: WO2014/191541
PCT Pub. Date: Dec. 4, 2014

(65) Prior Publication Data
US 2016/0102705 A1    Apr. 14, 2016

(30) Foreign Application Priority Data
May 30, 2013 (EP) .................................... 13169911

(51) Int. Cl.
*F16C 32/04* (2006.01)
*F04D 29/051* (2006.01)
(Continued)

(52) U.S. Cl.
CPC ........ *F16C 32/0442* (2013.01); *F04D 29/051* (2013.01); *F04D 29/058* (2013.01);
(Continued)

(58) Field of Classification Search
CPC ................................................. F16C 32/0442
See application file for complete search history.

(56) References Cited

U.S. PATENT DOCUMENTS

| 4,345,485 A | * | 8/1982 | Livet | B64G 1/28 74/5.1 |
| 4,629,261 A | * | 12/1986 | Eiermann | F16C 32/0442 251/30.01 |

(Continued)

FOREIGN PATENT DOCUMENTS

| CN | 1544821 A | 11/2004 |
| JP | S63198796 A | 8/1988 |
| JP | 2003269452 A | 9/2003 |

OTHER PUBLICATIONS

Unofficial English Translation of Chinese Office Action issued in connection with corresponding CN Application No. 201480031210.5 dated Dec. 28, 2016.

(Continued)

*Primary Examiner* — Robert W Horn
(74) *Attorney, Agent, or Firm* — GE Global Patent Operation

(57) ABSTRACT

A rotating machine comprises a shaft, a casing, at least one main magnetic bearing connected to the shaft for rotatably supporting the shaft inside the casing, at least one auxiliary radial rolling bearing and at least one auxiliary axial rolling bearing which are disposed between the shaft and the casing to respectively support radial loads only and axial loads only.

12 Claims, 2 Drawing Sheets

(51) Int. Cl.
   *F04D 29/058* (2006.01)
   *F04D 29/059* (2006.01)
   *F16C 39/02* (2006.01)
   *F16C 19/54* (2006.01)
   *F16C 19/06* (2006.01)
   *F16C 19/16* (2006.01)

(52) U.S. Cl.
   CPC ............ *F04D 29/059* (2013.01); *F16C 39/02* (2013.01); *F16C 19/06* (2013.01); *F16C 19/163* (2013.01); *F16C 19/545* (2013.01); *F16C 2360/44* (2013.01)

(56) References Cited

U.S. PATENT DOCUMENTS

| | | | | |
|---|---|---|---|---|
| 4,892,423 | A * | 1/1990 | Takahashi | F16C 19/54 384/611 |
| 5,231,323 | A * | 7/1993 | New | F16C 27/066 310/90 |
| 5,272,403 | A * | 12/1993 | New | F16C 32/0442 310/90 |
| 6,074,165 | A * | 6/2000 | Casaro | F04D 19/048 310/90.5 |
| 6,524,005 | B2 * | 2/2003 | Bridges | F16C 19/163 310/90.5 |
| 6,617,733 | B1 * | 9/2003 | Yamauchi | F04D 19/048 310/90.5 |
| 6,661,143 | B1 * | 12/2003 | Ohura | F04D 19/048 310/90 |
| 9,279,735 | B2 * | 3/2016 | Georgi | F16C 19/18 |
| 9,746,027 | B2 * | 8/2017 | Anders | F16C 32/0402 |
| 2004/0001657 | A1 * | 1/2004 | Muraki | F16C 19/54 384/504 |
| 2004/0189124 | A1 * | 9/2004 | Baudelocque | C12N 9/93 310/90.5 |
| 2009/0015012 | A1 | 1/2009 | Metzler et al. | |
| 2011/0084563 | A1 * | 4/2011 | Maier | F16C 32/0442 310/90.5 |
| 2011/0085753 | A1 * | 4/2011 | Tecza | F16C 27/066 384/462 |
| 2014/0003755 | A1 * | 1/2014 | Pausch | F16C 19/183 384/512 |
| 2014/0072253 | A1 * | 3/2014 | Ruhl | F16C 27/04 384/495 |
| 2014/0191604 | A1 * | 7/2014 | Hawkins | H02K 7/09 310/90.5 |
| 2014/0232226 | A1 * | 8/2014 | Lantto | H02K 7/08 310/90.5 |
| 2015/0003769 | A1 * | 1/2015 | Delepine | F16C 39/02 384/535 |
| 2015/0028706 | A1 * | 1/2015 | Anders | F16C 39/02 310/90.5 |
| 2015/0260221 | A1 * | 9/2015 | Anders | F01D 17/02 384/448 |
| 2016/0102705 | A1 * | 4/2016 | Mei | F04D 29/051 310/90.5 |
| 2016/0123388 | A1 * | 5/2016 | Falomi | F16C 35/061 310/90.5 |
| 2016/0312826 | A1 * | 10/2016 | Kawashima | F16C 19/06 |
| 2017/0102030 | A1 * | 4/2017 | Schroeder | H02K 7/09 |

OTHER PUBLICATIONS

International Search Report and Written Opinion dated Oct. 23, 2015 which was issued in connection with PCT Patent Application No. PCT/EP2014/061217 which was filed on May 29, 2014.

European Search Report and Written Opinion dated Nov. 12, 2013 which was issued in connection with EP Patent Application No. 13169911.8 which was filed on May 30, 2013.

\* cited by examiner

ROTATING MACHINE WITH AT LEAST ONE ACTIVE MAGNETIC BEARING AND AUXILIARY ROLLING BEARINGS

BACKGROUND

The embodiments disclosed relate generally to rotating machines with at least a main active magnetic bearing and auxiliary rolling bearings. In particular, the embodiments relate to rotating turbomachines such as compressors, expanders, turbines, pumps, etc. The turbomachines are used in engines, turbines, power generation, cryogenic applications, oil and gas, petrochemical applications, etc.

One turbomachine often used in the industry includes a centrifugal compressor which increases the pressure of a compressible gas through the use of mechanical energy by rotating centrifugal impellers through which the gas passes. The impellers are attached to a compressor shaft. The rotating shaft and the associated impellers form a rotor assembly which is supported in the stator of the compressor by active radial and axial magnetic bearings.

The active magnetic bearings levitate and maintain the rotor assembly in posit ion inside the stator by applying electromagnetic forces on the assembly in axial and radial direct ions. To this end, the active magnetic bearings comprise electromagnets supplied with electrical energy. With such magnetic bearings, the rotor assembly is held with no mechanical contact. Such a holding necessitate supplying the electromagnets with sufficient electrical power.

Failure or insufficient normal operation of the active magnetic bearings may sometimes occur with an interrupt ion of the electrical power supply. Failure may also occur in the event of excessive load s applied on the rotor assembly.

In these cases, the active magnetic bearings no longer center the rotor assembly inside the stator. Accordingly, there appears a "landing" phase during which the rotor assembly tends to come into contact with the stator and is held with mechanical contact.

To overcome this drawback, the centrifugal compressor further comprises two single row angular contact ball bearings mounted face-to-face on the compressor shaft axially next to the active magnetic bearings. Each auxiliary rolling bearing is provided to support both radial and axial loads when a "landing" phase appears.

However, with such ball bearings, the number of landing phases which can be sustained without any inadmissible changes in clearance dimensions of the bearings is limited. This leads to a reduction of the reliability of the rotating machine and to an increase of the maintenance operations. Besides, for a rotating machine with limited accessibility, costs of such maintenance operations can be high.

One aim of embodiments of the present invention is to overcome these drawbacks.

SUMMARY OF THE INVENTION

It is a particular object of embodiments of the present invention to provide a rotating machine having auxiliary rolling bearings with increased service life in order to allow a greater number of landing phases.

It is a further object of embodiments of the present invention to provide a rotating machine with low maintenance costs due to such landing phases.

In an embodiment, a rotating machine includes a shaft, a casing, at least one main magnetic bearing connected to the shaft for rotatably supporting the shaft inside the casing, and at least one auxiliary radial rolling bearing and at least one auxiliary axial rolling bearing which are disposed between the shaft and the casing to respectively support radial loads only and axial loads only.

Thanks to the split between the radial rolling bearing and the axial rolling bearing for carrying the radial and axial landing loads, the load capacity of each bearing is strongly increased. Each rolling bearing only works in one direction, i.e. radial or axial direction. Accordingly, the number of landing phases which can be sustained by the rolling bearings is increased.

The radial rolling bearing may be axially spaced apart from the axial rolling bearing.

In some embodiments, a radial clearance is provided between the shaft and an inner ring of each of the radial and axial rolling bearings. In an embodiment, the radial clearance provided between the shaft and the inner ring of the axial rolling bearing may be bigger than the radial clearance provided between the shaft and the inner ring of the radial rolling bearing.

In one embodiment, the shaft comprises at least a sleeve radially interposed between an outer surface of the shaft and the radial and axial rolling bearings. The radial clearances may be provided between the inner ring of each of the radial and axial rolling bearings and the associated sleeve.

In one embodiment, the auxiliary rolling bearings are disposed axially next to the main magnetic bearing.

In one embodiment, the rotating comprises two radial rolling bearings axially in contact one to another and two axial rolling bearings axially in contact one to another. The radial rolling bearings may be deep groove ball bearings or four-point contact ball bearings. The axial rolling bearings may be angular contact thrust ball bearings.

In an embodiment, the rotating machine may further comprise at least one pre-stressing and damping element exerting an axial force on at least one of the radial and axial rolling bearings.

The service life of each bearing is also increased with the use of at least one axial pre-stressing and damping element which can decrease the dynamic axial landing loads effects.

In some embodiments, the rotating machine may comprise at least one pre-stressing and damping element exerting an axial force on each of the radial and axial rolling bearings.

In one embodiment, a first pre-stressing and damping element may be mounted on the casing and axially bears against an outer ring of the axial rolling bearing. A second pre-stressing and damping element may also be mounted between the casing and the outer ring of the axial rolling bearing axially on the side opposite to the first pre-stressing element, the first and second pre-stressing and damping elements exerting two axial opposed forces on the axial rolling bearing.

In one embodiment, a pre-stressing and damping element may be mounted on the casing and axially bears against an outer ring of the radial rolling bearing. The pre-stressing and damping elements may comprise an elastic plate spring or a conical washer.

BRIEF DESCRIPTION OF THE DRAWINGS

Other characteristics used will appear on reading the following detailed description of a particular embodiment of the invention given by way of non-limiting example and illustrated by the accompanying drawings in which.

DETAILED DESCRIPTION

The following detailed description of the embodiments refer to the accompanying drawings. The same reference numbers in different drawings identify the same elements.

Figure 1:
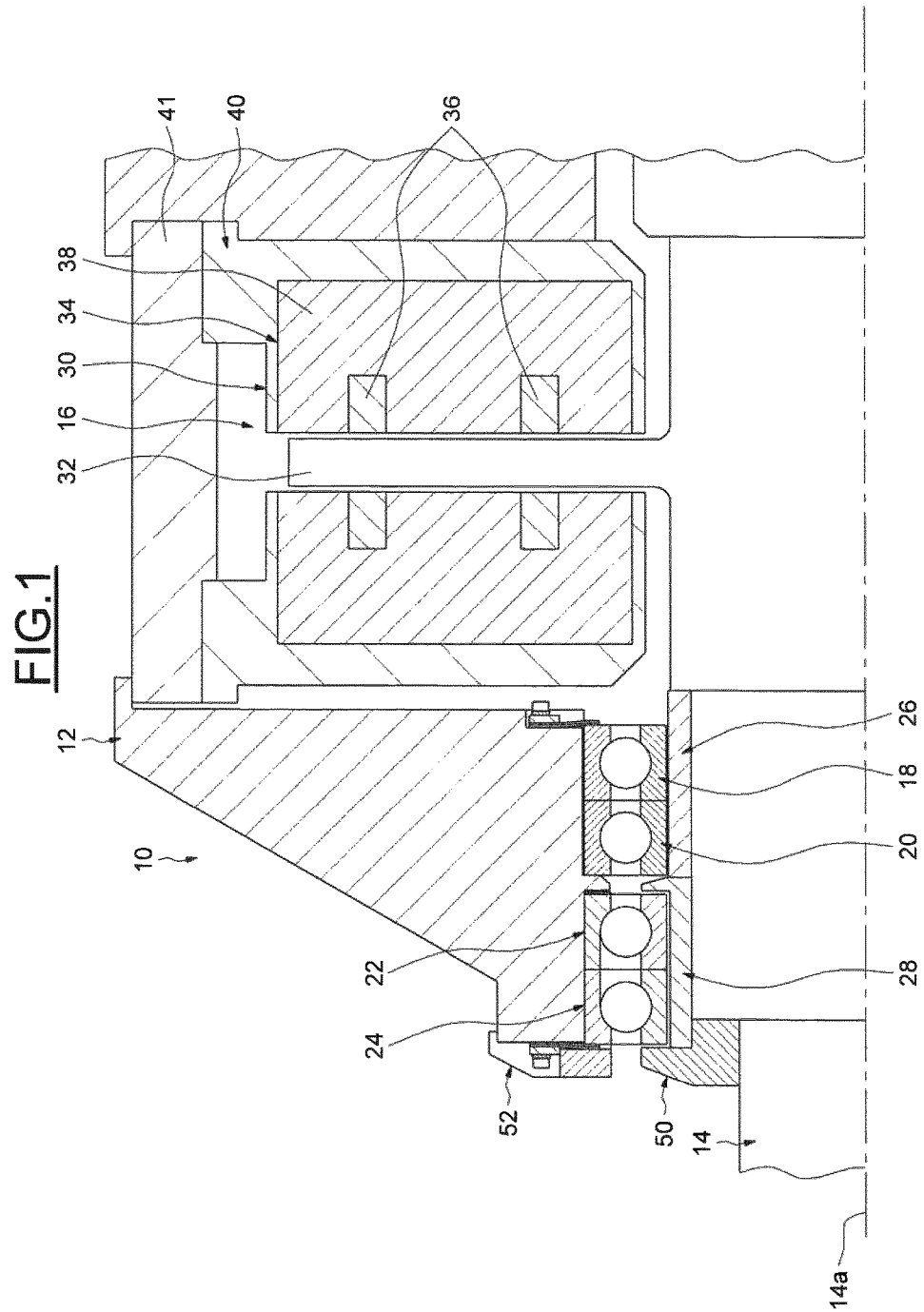
FIG. 1 is a partial axial section of a rotating machine according to an embodiment.

FIG. 1 partially illustrates an embodiment of a rotating machine 10 of the invention. The rotating machine 10 comprises a casing 12, a rotating shaft 14 extending along an axis 14a and adapted to support a rotor part (not shown). For example, if the rotating machine is a centrifugal compressor, the rotor part comprises impellers. The rotating shaft and the associated rotor part form a rotor assembly.

The rotating machine 10 also comprises at least one main active magnetic bearing 16 connected to the shaft 14 and supporting the shaft inside the casing 12, and auxiliary rolling bearings 18 to 24 associated to the magnetic bearing 16 and radially mounted between the shaft 14 and the casing 12 to support and transmit radial and axial loads there between when the magnetic bearing 16 is not operating normally. The rotating machine 10 further comprises annular sleeves 26, 28 radially disposed between the auxiliary rolling bearings 18 to 24 and the shaft 14. The auxiliary rolling bearings 18 to 24 are disposed axially next to the magnetic bearing 16 on the same side of the bearing. The auxiliary rolling bearings 18 to 24 are fixed to the casing 12 and radially surround the shaft 14. The rolling bearings 18, 20 are axially spaced apart from the rolling bearings 22, 24.

The main magnetic bearing 16 may be provided at one end of the casing 12. The magnetic bearing 16 is of the axial type. A ma in radial type magnetic bearing (not shown) may also be associated to the axial magnetic bearing 16 to support the rotating shaft 14. The active magnetic bearing 16 comprises a stator armature 30 fixed to the casing 12 and a rotor armature 32 in the form of a disk secured to the rotating shaft 14. The stator armature 30 comprises a stator magnetic circuit 34 including, in conventional manner, annular coils 36 and a ferromagnetic body 38 which may be massive or laminated locally. The stator armature 30 also comprises a protective annular support 40 into which is placed the magnetic circuit 34. The support 40 is secured to a stationary support element 41 that is itself fixed to the casing 12. The stator magnetic circuit 34 is placed axially facing the rotor armature 32 with no mechanical contact.

In normal operation, i.e. with the magnetic bearing(s) operating normally and with no excessive loads on the shaft 14, the bearing(s) holds the rotor assembly centered in the casing 12. When the magnetic bearing(s) is (are) not operating normally, the rolling bearings 18, 20 form radial rolling bearings adapted to limit radial movements of the shaft 14 inside the casing 12 and to support and transmit radial loads only there between. The rolling bearing 22, 24 form axial rolling bearings adapted to carry axial loads only. The arrangement of the rolling bearings 18, 20 and of the rolling bearings 22, 24 between the shaft 14 and the casing 12 is adapted to this end.

In the disclosed embodiment, the rolling bearings 18, 20 are deep grove rolling bearings axially in contact one to another and the rolling bearings 22, 24 are angular contact thrust rolling bearings also axially in contact one to another. The radial rolling bearings 18, 20 are arranged on the shaft 14 axially next to the active magnetic bearing 16 the axial rolling bearings 22, 24 are arranged on the shaft on the side opposite to said magnetic bearing with regard to the rolling bearings 18, 20. Since the rolling bearings 18 and 20, respectively 22 and 24, are identical, only one of them will be described here, it being understood that the identical elements of the other rolling bearing have the same reference.

Figure 2:
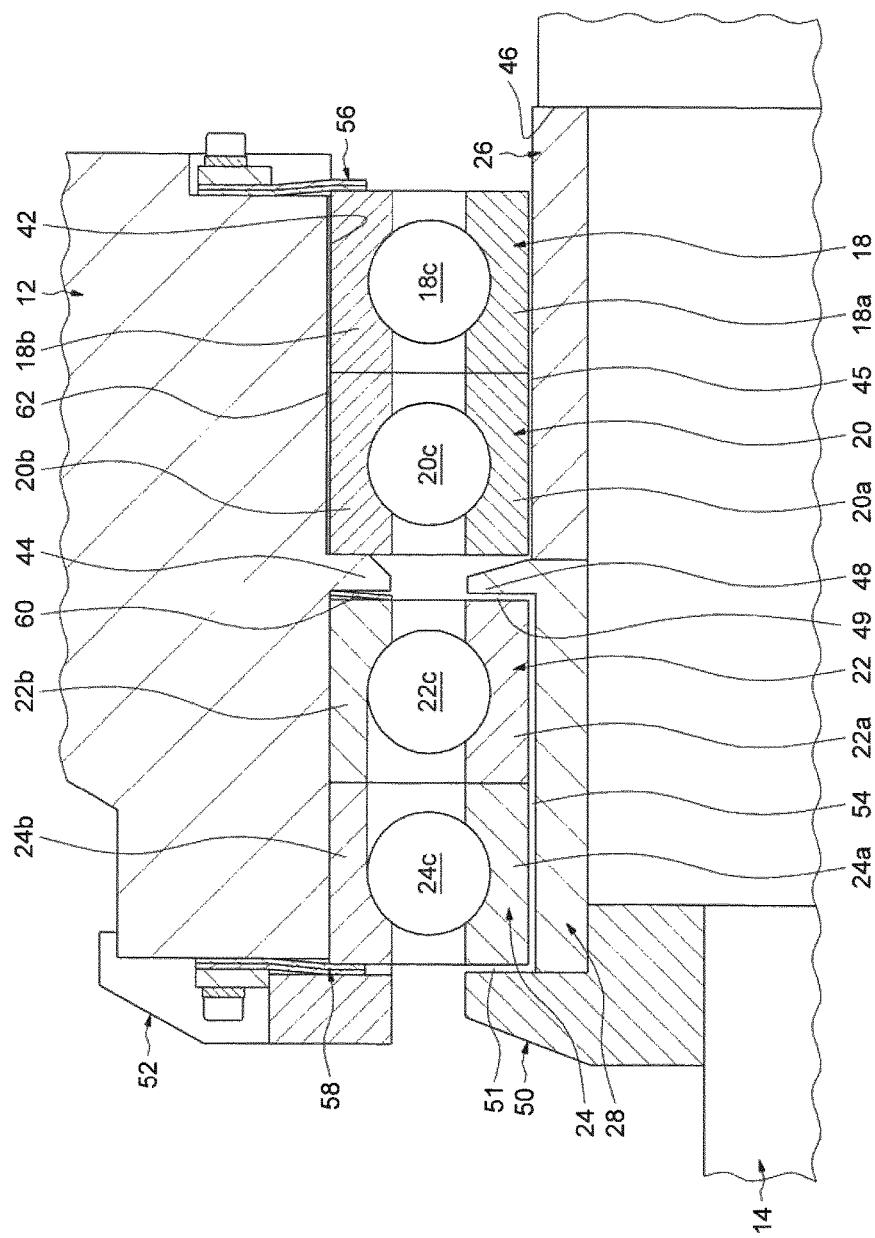
FIG. 2 is part section on a larger scale of FIG. 1.

As shown more clearly on FIG. 2, the radial rolling bearing 18 comprises an inner ring 18a, an outer ring 18b and a plurality of rolling elements 18c, which in this case are balls, radially interposed between the rings. The axis of the rolling bearing 18 is coaxial with the axis of the shaft. The inner ring 18a comprises a cylindrical bore mounted around an outer cylindrical surface of the sleeve 26, an outer cylindrical surface, two opposite radial faces delimiting axially the bore and the outer surface, and a toroidal circular raceway formed onto the outer surface for the rolling elements 18c, the raceway being directed radially outwards. The outer ring 18b comprises an outer cylindrical surface mounted into an axial bore 42 of the casing, a cylindrical bore, two opposite radial faces delimiting axially the outer surface and the bore, and a toroidal circular raceway formed onto the bore for the rolling elements 18c, the raceway being directed radially inwards.

As above-mentioned, the two radial rolling bearings 18, 20 are mounted axially in contact one to another. The radial faces of the inner and outer rings 18a, 18b of the rolling bearing 18 which are oriented axially towards the other rolling bearing 20 axially bear against the corresponding radial faces of the inner and outer rings 20a, 20b of the bearing. The opposite radial face of each inner ring 18a, 20a is not in axial contact with means axially secured on the sleeve 26 or on the shaft 14. The radial faces of the inner rings 18a, 20a are uncovered. The rolling bearing 18 slightly protrudes inwards with regard to the bore 42 of the casing. Axially on the side opposite to the rolling bearing 18, the radial face of the outer ring 20b axially bears against a radial protrusion 44 formed on the bore 42 of the casing and extending radially inwards.

The rolling bearings 18, 20 are radially disposed around the sleeve 26 which is mounted on the outer surface of the shaft 14. A first radial clearance 45 is provided between the bore of the inner rings of the rolling bearings 18, 20 and the outer surface of the sleeve 26. The sleeve 26 axially bears at one end against a radial shoulder 46 formed on the shaft and, at the opposite axial end, against the other sleeve 28 associated to the rolling bearings 22, 24.

The axial rolling bearing 22 comprises an inner ring 22a, an outer ring 22b and a plurality of rolling elements 22c, which in this case are balls, radially interposed between the rings. The axis of the rolling bearing 22 is coaxial with the axis of the shaft. The inner ring 22a is identical to the inner ring 18a of the radial rolling bearing 18 and comprises a cylindrical bore mounted around an outer cylindrical surface of the sleeve 28, an outer cylindrical surface, two opposite radial faces and a toroidal circular raceway for the rolling element s 22c. The outer ring 22b comprises an outer cylindrical surface mounted radially into contact with the bore 42 of the casing, a first cylindrical bore of small diameter, a second cylindrical bore of larger diameter and a circular raceway for the rolling elements 22c connected to the bores in order that the rolling bearing 22 can accommodate axial loads only in one direction. The outer ring 22b also comprises two opposite radial faces delimiting axially the outer surface and the bores.

As above-mentioned, the two axial rolling bearings 22, 24 are mounted axially in contact one to another. The rolling bearings 22, 24 are arranged face-to-face in order to accommodate axial loads acting in both directions. The radial faces of the inner and outer rings 22a, 22b of the rolling bearing 22 which are oriented axially towards the other rolling bearing 24 axially bear against the corresponding radial faces of the inner and outer rings 24a, 24b of the bearing. The opposite radial face of the inner ring 22a axially faces a radial annular rib 48 formed at an axial end of the sleeve 28. An axial clearance 49 is provided between the rib 48 and the inner ring 22a. The axial end of the sleeve 28 comprising the rib 44 axially bears against the sleeve 26. An abutting ring 50 is secured on the shaft 14 and axially faces the radial face of the inner ring 24a which is located axially on the side opposite to the rolling bearing 22, i.e. oriented axially outwards. An axial clearance 51 is provided between the abutting ring 50 and the inner ring 24a. The abutting ring 50 abuts against the sleeve 28 axially on the side opposite to the rib 48. A retaining ring 52 is secured on the casing 12 and radially surrounds the abutting ring 50. The retaining ring 52 axially faces the radial face of the outer ring 24b oriented axially outwards. The radial face of the outer ring 22b oriented axially inward faces the protrusion 44. The outer rings of the rolling bearings 22, 24 are axially maintained in position into the bore 42 of the casing by stopping or retaining means formed or secured on the casing, i.e. the protrusion 44 and the retaining ring 52. The rolling bearing 24 slightly protrudes outwards with regard to the bore 42 of the casing.

Between the inner rings of the rolling bearings 22, 24 and the outer surface of the sleeve 28, there is a second radial clearance 54 which is smaller than a maximum radial clearance foreseen for the shaft 14 inside the casing 12, and bigger than the first radial clearance 45 provided between the rolling bearings 18, 20 and the sleeve 26.

The rotating machine 10 further comprises elastic springs 56, 58 and 60 provided to axially preload the rolling bearings 18, 20 and 22, 24. The elastic spring 56 is fixed on the casing 12 and acts on the radial face of the outer ring 18b of the radial rolling bearing which is oriented axially inwards, i.e. located axially on the side opposite to the other radial rolling bearing 20. The elastic spring 56 exerts a permanent axial force on the rolling bearing 18. The elastic spring 56 also t ends, via the rolling bearing 18, to axially push and preload the other rolling bearing 20 against the protrusion 44 of the casing. The load applied by the elastic spring 56 therefore axially pre-stresses both the rolling bearings 18, 20 against the protrusion 44 of the casing.

Similarly, the elastic spring 58 is fixed on the casing 12 and acts on the radial face of the outer ring 24b of the axial rolling bearing which is oriented axially outwards, i.e. located axially on the side opposite to the other axial rolling bearing 22. The elastic spring 58 is in axial contact against the rolling bearing 24 on one side and in axial contact with the retaining ring 52 on the other side. The elastic spring 58 exerts a permanent axial force on the rolling bearing 24. The elastic spring 58 also tends, via the rolling bearing 24, to axially push and preload the other rolling bearing 22 towards the protrusion 44 of the casing. The load applied by the elastic spring 58 therefore axially pre-stresses both the rolling bearings 22, 24 towards the protrusion 44 of the casing. In the disclosed embodiment, the axial elastic springs 56, 58 each comprise two superposed metal elastic plate springs.

The elastic spring 60 is axially disposed between the protrusion 44 of the casing and the radial face of the outer ring 22b of the axial rolling bearing. The elastic spring 60 is in axial contact against the rolling bearing 22 on one side and in axial contact with the protrusion 44 on the other side. The elastic spring 60 exerts a permanent axial force on the rolling bearing 22 along a direction opposite to the axial force exerted by the elastic spring 58. The elastic springs 58, 60 both axially preload the two rolling bearings 22, 24. Here, the radial dimension of the elastic spring 60 is substantially equal to the radial dimension of the outer ring 22b and of the protrusion 44. In the disclosed embodiment, the axial elastic spring 60 is a metal elastic washer, for example of the Belleville washer type.

The rotating machine further comprises an annular damping sleeve 62 mounted on the outer surface of the outer rings 18b, 20b and coming radially into contact with the bore 42 of the casing. The damping sleeve 62 may be made from elastic material.

In normal operation, the active magnetic bearing(s) hold(s) the shaft 14 centered in the casing 12 and there is no contact between the inner rings of the rolling bearings 18 to 24 and the sleeves 26, 28 mounted on the shaft. The elastic springs 56, 58 and 60 which axially pre load the rolling bearings 18, 20 and 22, 24 prevent the bearings from unexpected rotation.

In the event of a landing phase, the shaft 14 can move both axially and radially inside the casing 12. The shaft 14 can move axially by virtue of the axial clearances 49, 51 provided between the rolling bearings 22 and 24, the sleeve 28 and the abutting ring 50. The shaft 14 can move radially by virtue of the radial clearance 45 provided between the sleeve 26 and the inner rings of the rolling bearings 18, 20 until it comes radially in contact with the rings. This leads to a rotation of the inner rings 18a, 20a of the bearings. After such a radial contact between the shaft 14 and the rolling bearings 18 and 20, there is still the radial clearance 54 between the sleeve 28 mounted on the shaft and the rolling bearings 22, 24. During the landing phase, the radial clearance 54 subsists. Accordingly, the radial dynamic landing loads are supported only by the radial rolling bearings 18, 20.

In case of an axial displacement of the shaft 14 during a landing phase, the axial dynamic landing loads are supported only by the axial rolling bearings 22, 24. The axial dynamic loads are transmitted to the rolling bearings 22, 24 by the axial contact between the rib 48 and the inner ring 22a, or by the axial contact between the abutting ring 50 and the inner ring 24a according to the direction of the loads, and then to the retaining ring 52 or the protrusion 44.

In the event of a landing phase, the rolling bearings 18, 20 form radially acting landing mechanical bearing s which are adapted to limit radial movements of the shaft 14 inside the casing 12 and to support radial loads only. The rolling bearing 22, 24 form axially acting landing mechanical bearings which are adapted to support axial loads only. Otherwise, the elastic springs 56, 58 and 60 are able to damper the axial landing loads. The elastic springs perform a dual function, namely to axially preload the rolling bearings 18 to 24 and additionally to damper the axial landing loads. When a landing phase appears, the shaft 14 passes from a state of being held with no contact to a state of being held by virtue of mechanical contacts with the rolling bearings 18 to 24.

Thanks to the split between the radial rolling bearings 18, 20 and the axial rolling bearing 22, 24 for carrying the radial and axial landing loads, the load capacity of each bearing is strongly increased. Axial and radial landing loads are supported by two types of rolling bearings which are distinct from one another. Each rolling bearing only works in radial or axial direction. Accordingly, the number of landing phases which can be sustained by the auxiliary rolling bearings 18 to 24 is increased. Otherwise, the service life of each bearing is also increased with the use of axial elastic dampers which decrease the dynamic axial loads effects.

In the disclosed embodiment, the axial rolling bearings 22, 24 are angular contact thrust ball bearings. Alternatively, the axial rolling bearings may be for example deep groove ball bearings, four-point contact balls bearings, tapered roller bearings, spherical roller bearings, etc. In the disclosed embodiment, the axial rolling bearings 22, 24 only work in axial direction since the radial clearance 54 subsists between the sleeve 28 supported by the shaft 14 and the inner rings of the bearings even when occurs a landing phase. The disposition of the rolling bearings 22, 24 between the shaft 14 and the casing 12 is thus adapted to carry axial loads only. Alternatively, it could also be possible to use a rolling bearing having a structure that can accommodate axial loads only, for example thrust ball bearings or thrust tapered or spherical roller bearings or thrust needle roller bearings. In this case, the radial clearance foreseen between these thrust bearings and the shaft can be equal to the one provided between the radial rolling bearings and the shaft. Accordingly, during a landing phase, both the axial and radial rolling bearings are in radial contact with the shaft.

In the disclosed embodiment, the radial rolling 18, 20 bearings are deep groove ball bearings. Alternatively, the radial rolling bearings may be for example angular contact ball bearings or four-point contact balls bearings. In the described embodiment, the arrangement of the rolling bearings 18, 20 between the shaft 14 and the casing 12 is adapted to support only radial loads. Alternatively, it could also be possible to foresee a rolling bearing having a structure that can accommodate radial loads only, for example cylindrical or toroidal roller bearings or needle roller bearings.

The above description is made with reference to a rotary machine comprising two axial and two radial rolling bearings having each a single row of rolling elements. However, it can be applied in like manner to a rotary machine comprising one axial rolling bearing and one radial rolling bearing having each one row of rolling elements or at least two rows of rolling elements.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A rotating machine comprising:
a shaft;
a casing;
at least one main magnetic bearing connected to the shaft for rotatably supporting the shaft inside the casing;
at least one auxiliary radial rolling bearing and at least one auxiliary axial rolling bearing disposed between the shaft and the casing to respectively support radial loads only and axial loads only; and
a first sleeve mounted on the shaft and interposed between an outer surface of the shaft and an inner ring of the at least one auxiliary radial rolling bearing with a first radial clearance provided between the first sleeve and the inner ring of the at least one auxiliary radial rolling bearing, and a second sleeve mounted on the shaft and interposed between the outer surface of the shaft and an inner ring of the at least one auxiliary axial rolling bearing with a second radial clearance provided between the second sleeve and the inner ring of the at least one auxiliary axial rolling bearing,
wherein the second radial clearance is greater than the first radial clearance.

2. A rotating machine according to claim 1, wherein the radial rolling bearing is axially spaced apart from the axial rolling bearing.

3. A rotating machine according to claim 1, wherein the auxiliary rolling bearings are disposed axially next to the main magnetic bearing.

4. A rotating machine according to claim 1, comprising two radial rolling bearings axially in contact one to another and two axial rolling bearings axially in contact one to another.

5. A rotating machine according to claim 1, wherein each of the at least one radial rolling bearing is a deep groove ball bearing or a four-point contact ball bearing.

6. A rotating machine according to claim 1, wherein each of the at least one axial rolling bearing is an angular contact thrust ball bearing.

7. A rotating machine according to claim 1, further comprising at least one pre-stressing and damping element exerting an axial force on at least one of the radial and axial rolling bearings.

8. A rotating machine according to claim 7, comprising at least one pre-stressing and damping element exerting an axial force on each of the radial and axial rolling bearings.

9. A rotating machine according to claim 7, wherein a first pre-stressing and damping element is mounted on the casing and axially bears against an outer ring of the axial rolling bearing.

10. A rotating machine according to claim 9, wherein a second pre-stressing and damping element is mounted between the casing and the outer ring of the axial rolling bearing axially on the side opposite to the first pre-stressing element, the first and second pre-stressing and damping elements exerting two axial opposed forces on the axial rolling bearing.

11. A rotating machine according to claim 7, wherein a pre-stressing and damping element is mounted on the casing and axially bears against an outer ring of the radial rolling bearing.

12. A rotating machine according to claim 1, wherein the at least one radial rolling bearing is a four-point contact ball bearing.

* * * * *